Aug. 14, 1962   M. J. SMITH   3,049,072
ROTARY ROAST RACK
Filed July 17, 1958   2 Sheets-Sheet 1

INVENTOR.
MAHLON J. SMITH
BY
Andrew F. Wintercorn
ATTORNEY

Aug. 14, 1962  M. J. SMITH  3,049,072
ROTARY ROAST RACK
Filed July 17, 1958  2 Sheets-Sheet 2
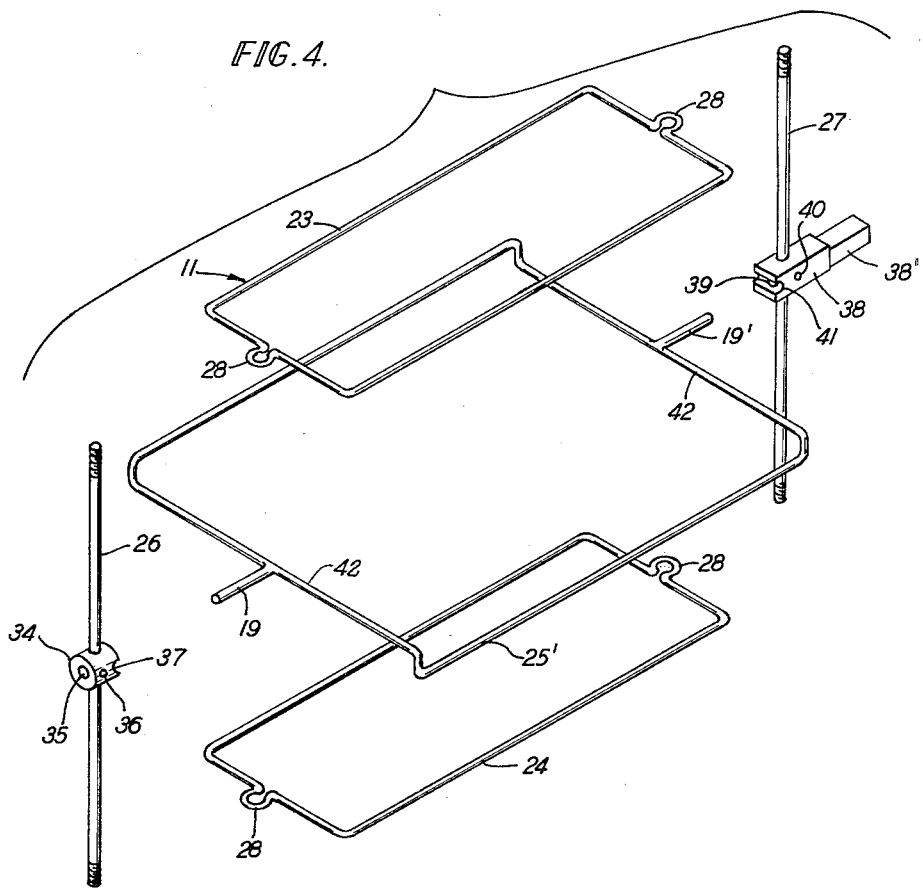
FIG.4.
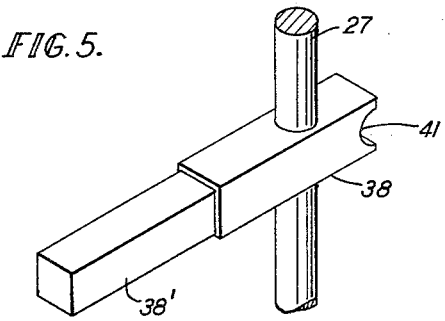
FIG.5.
INVENTOR.
MAHLON J. SMITH
BY
ATTORNEY United States Patent Office 3,049,072
Patented Aug. 14, 1962

3,049,072
ROTARY ROAST RACK
Mahlon J. Smith, Niles, Mich., assignor to The Washburn Company, Worcester, Mass., a corporation of Massachusetts
Filed July 17, 1958, Ser. No. 749,223
4 Claims. (Cl. 99—427)

This invention relates to rotary racks for use in the broiling and roasting of meats and other foods over an open fire, the present construction being particularly adapted for the barbecuing of roasts, turkeys, chickens, small pigs and the like.

The principal object of my invention is to provide a rotary roast rack designed for use with charcoal broilers and the like, constructed for quick and easy installation in such broilers and universal adaptability for different makes thereof available, and also quickly and easily adjustable by simple threaded adjustments to secure a fairly balanced condition, or to restore the structure to such a condition, and at all times securely hold different sizes of animals or birds, such as small pigs and large turkeys, the rack being constructed of flexible resilient wire and furthermore quickly and easily tightenable for the more secure holding of the meat being broiled to compensate for the inevitable shrinkage, the resilience of the structure combined with the threading of the adjusting nuts enabling fine adjusting for balance in either direction with respect to the axis of rotation without danger whatsoever of dropping the meat accidentally in the process of changing the settings.

Another important object of my invention pertains to the design and construction of the rack, which enables the interfitting of the parts in such a way as to obtain the desired amount of rigidity necessary for secure holding of the meat in all settings, while nevertheless permitting the disassembled parts to be packed laid flat in a relatively small box for convenience in the handling and shipment thereof in quantities, as well as for convenience in the handling and shipment of replacement parts which may occasionally be ordered.

The invention, more specifically stated, embodies the following features:

(1) The use of threaded studs, which, though separate, are adapted to be assembled in fairly rigid right angle relationship to the opposite ends of the rectangular frame, said studs being adapted to have rectangular clamp frames mounted thereon for adjustment toward and away from one another by the adjustment of wing-nuts threaded on the studs to hold the meat securely and enables easy takeup from time to time to compensate for shrinkage, and (2) The construction according to number 1 has the threaded studs carried on separate collars slidable over the coaxially arranged supporting shafts on both ends of the rectangular main frame, the collars being grooved diametrically of their inner ends for interlocking engagement with the ends of the frame and having set screws for fastening the same in assembled position.

The invention is illustrated in the accompanying drawings in which:

FIG. 4 is an exploded perspective view of the parts of the rotary roast rack shown assembled in FIG. 2;

FIG. 5 is a perspective view of a portion of one part shown in FIG. 4, and;

Similar reference numerals are applied to corresponding parts throughout the views.

Figure 1:
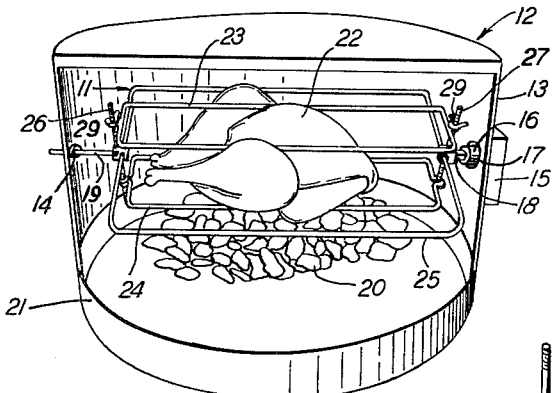
FIG. 1 is a perspective view of an outdoor broiler unit in which a rotary roast rack made in accordance with my invention has been installed.
Figure 2:
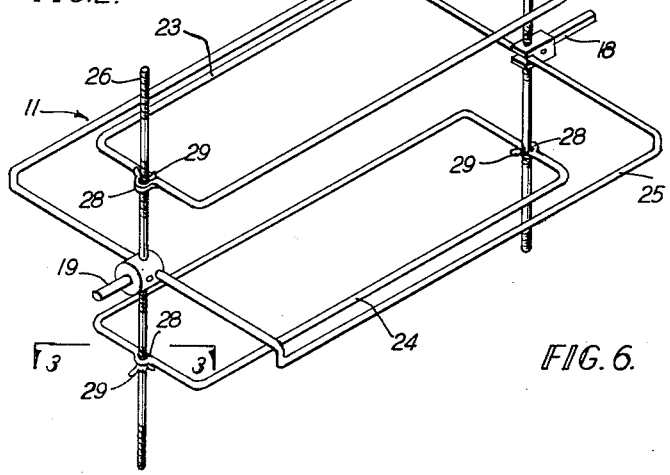
FIG. 2 is a perspective view of the rotary roast rack removed from the broiler.
Figure 3:
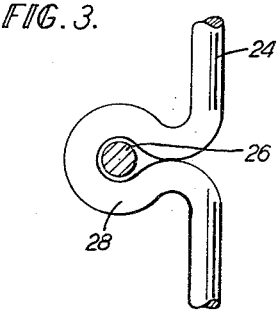
FIG. 3 is a sectional detail on the line 3—3 of FIG. 2, showing the parts substantially full size.

Referring to the drawings, the reference numeral 11 designates the rotary roast rack of my invention generally, shown installed in an outdoor barbecuing unit 12, the hood or cover portion 13 of which has a bearing 14 in one side wall thereof, and a housing 15 mounted on the outer side of the opposite side wall containing the usual reduction gearing to enable slow speed driving of the rack 11 by means of an electric motor (not shown). Only the hub portion 16 of the slow speed drive gear is shown as projecting through an opening 17 in the side wall of the hood 13 for driving connection with the square drive portion 38' on a collar 38 assembled on the adjacent end of the rack 11 over the round shaft 19' seen in FIG. 4, the coaxially arranged supporting round shaft 19 on the other end of the rack 11 being entered in the bearing 14 previously mentioned for rotary support of the rack 11 over the charcoal fire-bed 20 in the base 21 of the broiling unit. A large turkey, dressed and stuffed and ready for broiling is shown at 22 clamped firmly but resiliently between the two smaller rectangular open wire frames 23 and 24 which turn with the larger rectangular open wire main frame 25. Threaded studs 26 and 27, which, though separate, are adapted to be assembled on the rack, and, when so assembled, are fairly rigid with the opposite ends of frame 25 and disposed in right angle relationship thereto and substantially parallel to one another, project through outwardly projecting loop portions 28 formed in the middle of the opposite ends of the clamp frames 23 and 24, as clearly appears in FIGS. 2 and 3, and wing-nuts 29 are threaded on the studs and bear against the portions 28 from above the frame 23 and below the frame 24 to urge these frames toward each other to clamp the meat, such as a small pig, a large turkey or chicken, or other meat, such as a roast, firmly between these frames for the broiling thereof.

In operation, during the broiling, it is a simple matter to stop the drive motor and tighten the nuts 29 to compensate for shrinkage of the meat and/or correct for an unbalanced condition. The flexible resilience of the frames and the consequent bowing thereof in the clamping of a roast, for example, makes it unnecessary to tighten the nuts often during a broiling or roasting operation. The fact that the threaded studs 26 and 27 are of approximately the same diameter as the wire of the frames 23 and 24 and adapted to flex substantially as readily, and that the threaded studs have a loose fit in the loops 28 on the opposite ends of these frames, and that the sides of the loops 28 are rounded to glide over the threads on the studs fairly easily in the adjusting of the wing nuts 29, all taken together, account for the fact that there is never any noticeable binding of the parts, and hence neither of the frames 23 and 24 gets caught in a certain position and fails to follow the associated wing nuts 29 in their adjustment up or down on studs 26 and 27. Prior construction failed to operate so smoothly in all conditions of adjustment, and without this nicety of adjustment, users were compelled to put up with unbalanced conditions which imposed unnecessary strain upon the driving mechanism and made the operation unnecessarily noisy and annoying. In clamping the meat, it is not essential that the frames 23 and 24 be kept absolutely parallel to one another, and hence the nuts 29 at one end of the rack 11 can be tightened in one takeup, and the nuts 29 at the other end can be tightened in the next takeup, without danger of throwing the rack too far out of balance. In any event, there is never any danger of the meat being accidentally dropped into the fire in the process of changing the settings to compensate for shrinkage, whereas with prior constructions there was always that danger. The fact that the loops 28 have abutment with the studs 26 and 27 on the outer side thereof is of considerable advantage from the standpoint that any flexing or bowing of the frames 23 and 24 incident to the tightening of the nuts 29 will tend only to draw the loop portions 28 into tighter abutment with the studs 26 and 27 and flex these studs inwardly toward each other. It is under these conditions that the rounded surfaces on the loops 28 loosely engaging the studs 26 and 27 and designed to ride smoothly up or down on these studs, despite the flexed condition of the frames and studs, is so important, because it not only enables secure clamping of the meat without too much effort in the tightening of the wing nuts, but it also enables adjustment of the mass in clamped condition readily either way with respect to the axis of rotation for a well-balanced condition, for smooth, quiet operation and reduced wear and tear on the drive mechanism, by loosening nuts on one side and tightening them on the other side.

The flexibility and resilience of the frames 23 and 24 and studs 26 and 27 is also incidentally of advantage from the standpoint that it makes the nuts 29 hold their adjustment without any lock washers being used.

Referring to FIG. 4, it will be seen that the main frame 25 of rack 11 has coaxial supporting round shafts 19 and 19' provided on the opposite ends thereof on the longitudinal center line of the frame for support of the rack, and the studs 26 are mounted on a collar 34 slidable over the shaft 19 on one end of the frame 25, the shaft being received in a bore 35 provided therefor in the collar, and a set screw 36 being provided on the collar threaded in a radial hole provided therein to clamp the collar in place on the shaft 19 when the diametrically extending groove 37 provided in the inner end of the collar receives the cross-portion 42 on the adjacent end of the frame 25', to prevent turning of the collar with respect to the shaft and insure rigid right angle relationship of studs 26 with respect to the plane of frame 25. The outer end portion of this shaft 19 engages in bearing 14 in the broiler unit 12.

The studs 27 in a similar way are separate from the frame 25 and carried on the previously mentioned elongated square collar 38 having an axial bore 39 provided therein for reception of the shaft 19' on the adjacent end of the frame 25. Here again, a set screw 40 threaded in a radial hole provided in the collar serves to fasten the collar in place on the shaft 19' when the diametrically extending groove 41 provided in the inner end of the collar receives the cross-portion 42 on the adjacent end of the frame 25, whereby to prevent turning of the collar with respect to the shaft 19' and insure rigid right angle relationship of studs 27, with respect to the plane of frame 25. The square form of the drive portion 38' of the collar 38 enables slidable driving connection thereof in the hub 16 on the drive gear, as previously described.

Collar 38 is of stepped form having a square outer end portion 38' of reduced size, as seen in FIG. 5, adapted to fit in a square bore in hubs similar to hub 16 in other makes of broiler units for which the larger inner end portion of the collar 38 would be too large. In that way the rack 11 is usable interchangeably in a much larger number of makes of broiler units.

Figure 6:
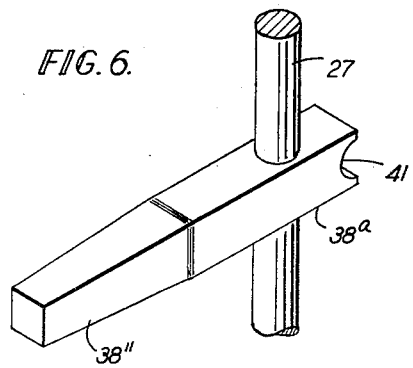
FIG. 6 is a view similar to FIG. 5 showing a modified or alternative construction for this detail.

In FIG. 6 I have shown a construction the same as that of FIG. 5 in which the collar 38a is the same as collar 38 of FIGS. 4 and 5 but has an outer end portion 38" of tapered form with a view to further increasing the adaptability of the rotary roast rack to use in various makes and styles of broiler units, it being manifest that with the taper of portion 38" a snug wedging fit is obtainable in a large range of sizes of square holes in drive collars.

It is believed the foregoing description conveys a good understanding of the objects and advantages of my invention. The appended claims have been drawn to cover all legitimate modifications and adaptations.

I claim:
1. A rotary roast rack comprising a substantially flat, generally rectangular, open main frame of wire construction, a pair of coaxially arranged supporting shafts rigid with and extending from the opposite ends of said frame on the longitudinal center line thereof for its rotary support, a pair of collars having axial holes provided therein by means of which they are removably mounted on said shafts, said collars being held against turning relative to said shafts when assembled thereon, threaded studs fixed on and projecting in aligned relation from opposite sides of said collars and disposed in substantially right angle relationship to said frame when said collars are disposed on said shafts in assembled relationship to said frame, manually adjustable nuts threaded on said studs, said studs on each side of said frame being resilient and flexible toward each other, and a pair of substantially flat, generally rectangular, open meat caging and clamping frames of flexible and resilient wire construction having stud receiving loops extending from the opposite ends thereof on their longitudinal center lines loosely slidably received on the studs on opposite sides of said main frame and adjustable inwardly on the studs toward each other by the tightening of said nuts, said meat caging and clamping frames, when removed from said studs, being adapted to be laid on and in close parallelism with said main frame, and said collars, when removed from said shafts, permitting the laying of the studs on and in close parallelism to said main frame and said meat caging and clamping frames for compact packaging of all of these parts in shipment and storage.

2. A rotary roast rack as set forth in claim 1, wherein one of said collars disposed on one of said shafts has an axial drive extension of polygonal cross-section adapted for detachable driving engagement in a similarly shaped polygonal bore in a rotary drive element whereby to transmit drive to said rack, the shaft on the other end of said main frame being adapted for detachable rotary engagement in a supporting bearing spaced from the stud carrying collar mounted on that shaft.

3. A rotary roast rack as set forth in claim 1, wherein each of said collars has a diametrically extending groove on the inner end thereof in right angle relationship to said studs on said collar adapted to receive an end portion of said main frame for holding said studs in right angle relationship to said main frame when said collar is assembled on said shaft in operative relationship to said main frame.

4. A rotary roast rack as set forth in claim 1, wherein each of said collars has a diametrically extending groove on the inner end thereof in right angle relationship to said studs on said collar adapted to receive an end portion of said main frame for holding said studs in right angle relationship to said main frame when said collar is assembled on said shaft in operative relationship to said main frame, each of said collars also having a radially threaded hole provided therein communicating with the axial hole and threadedly receiving a set-screw for clamping said collar on the shaft against endwise displacement relative thereto and to said main frame.

References Cited in the file of this patent

UNITED STATES PATENTS

| | | |
|---|---|---|
| 1,093,883 | Raillere | Apr. 21, 1914 |
| 1,359,749 | Schey | Nov. 23, 1920 |
| 1,594,187 | Adami | July 27, 1926 |
| 1,952,433 | Halstead | Mar. 27, 1934 |
| 2,122,780 | Peyton | July 5, 1938 |
| 2,144,918 | Garvis | Jan. 24, 1939 |
| 2,222,089 | Saffel | Nov. 19, 1940 |
| 2,320,304 | Rosset | May 25, 1943 |
| 2,387,621 | Stangle | Oct. 23, 1945 |
| 2,682,830 | Kupchik | July 6, 1954 |

FOREIGN PATENTS

| | | |
|---|---|---|
| 324,695 | Great Britain | Jan. 29, 1930 |